United States Patent [19]
Hegerhorst et al.

[11] Patent Number: 6,026,883
[45] Date of Patent: Feb. 22, 2000

[54] SELF-CONTAINED APPARATUS FOR FIBER ELEMENT PLACEMENT

[75] Inventors: Dennis R. Hegerhorst, Nampa, Id.; Boyd L. Hatch, West Valley City; Keith G. Shupe, Bountiful, both of Utah

[73] Assignee: Alliant Techsystems, Inc., Hopkins, Minn.

[21] Appl. No.: 09/070,421

[22] Filed: Apr. 30, 1998

[51] Int. Cl.[7] .................................................. B65H 81/00
[52] U.S. Cl. ......................... 156/441; 156/361; 156/425; 156/433; 156/497; 156/498; 156/499; 156/523; 156/574
[58] Field of Search ..................................... 156/433, 441, 156/523, 574, 425, 361, 498, 499, 497

[56] References Cited

U.S. PATENT DOCUMENTS

| | | |
|---|---|---|
| 3,551,237 | 12/1970 | Cox et al. . |
| 3,574,040 | 4/1971 | Chitwood et al. ...................... 156/522 |
| 3,772,126 | 11/1973 | Myers . |
| 3,962,393 | 6/1976 | Blad . |
| 4,137,354 | 1/1979 | Mayes, Jr. et al. . |
| 4,248,649 | 2/1981 | Harrison et al. . |
| 4,470,860 | 9/1984 | Gill et al. . |
| 4,508,584 | 4/1985 | Charles ................................. 156/353 |
| 4,633,632 | 1/1987 | Sarh . |
| 4,735,672 | 4/1988 | Blad . |
| 4,872,619 | 10/1989 | Vaniglia ............................... 242/437.3 |
| 4,877,193 | 10/1989 | Vaniglia . |
| 4,907,754 | 3/1990 | Vaniglia . |
| 4,938,824 | 7/1990 | Youngkeit . |
| 4,943,338 | 7/1990 | Wisbey . |
| 5,015,326 | 5/1991 | Frank ..................................... 156/511 |
| 5,045,147 | 9/1991 | Benson et al. . |
| 5,110,395 | 5/1992 | Vaniglia ................................. 156/353 |
| 5,145,543 | 9/1992 | Redd et al. ............................ 156/171 |
| 5,173,315 | 12/1992 | Charlson et al. . |
| 5,200,251 | 4/1993 | Brand . |
| 5,233,737 | 8/1993 | Policelli . |
| 5,290,389 | 3/1994 | Shupe et al. . |
| 5,472,553 | 12/1995 | Roberts . |
| 5,698,066 | 12/1997 | Johnson et al. ........................ 156/441 |
| 5,814,386 | 9/1998 | Vasiliev et al. . |
| 5,871,117 | 2/1999 | Protasov et al. . |

OTHER PUBLICATIONS

Ingersol sales brochure entitled "Automated Machinery for composite Manufacturing" dated Aug. 9, 1989, pp. 1–3, 5–7.

*Primary Examiner*—Jeff H. Aftergut
*Attorney, Agent, or Firm*—Trask, Britt & Rossa

[57] ABSTRACT

A self-contained apparatus for placement of discrete fiber element tows on a mandrel or other tooling. The apparatus carries a spooled fiber element supply, which is directed to a compaction roller over a short, non-convoluted path through a cut/add module having a knife assembly for severing a discrete tow from a continuous fiber element filament, and a drive assembly for feeding the tow and restarting feed of a new tow after severance of the prior one from the filament. The apparatus is particularly suitable for sequentially laying up superimposed, or stacked, tows to define rib-like stiffeners of composite material for reinforcing composite shell structures, and grids of such stiffeners. Methods of using the apparatus are also disclosed.

30 Claims, 6 Drawing Sheets

SELF-CONTAINED APPARATUS FOR FIBER ELEMENT PLACEMENT

BACKGROUND OF THE INVENTION

The present invention relates generally to the fabrication of composite structures and, more specifically, to a delivery head apparatus for placement of fiber elements employed in fabrication of such structures. The delivery head apparatus of the present invention is particularly suited for placement of discrete, elongated fiber elements in mutually superimposed relationship to define reinforcement or stiffening members for the interiors or exteriors of composite shells.

Composite reinforced, or "grid-stiffened", shell structures, such as shrouds, casings, fuel tanks, airfoils or wing skins, and fuselage panels would provide recognized advantages in aerospace applications over conventional metal (typically aluminum) assemblies in terms of relatively lower weight and higher strength for the composite structures. However, acceptance of all-composite structures has been hampered by the lack of a demonstrated, repeatable and inexpensive fabrication methodology and apparatus for effecting same in an automated manner. Thus, many such structures are limited to high-performance, military aerospace applications, as not being cost-competitive for commercial aerospace uses. For the same reason, present non-aerospace usage of composite structures is somewhat limited, as in many cases, metal structures accommodate design requirements at a lesser cost.

A composite shell structure may require discrete internal or external reinforcing elements or stiffeners, hereinafter referred to generally as "ribs", adjacent a continuous shell structure, to provide enhanced stiffness to the shell structure in terms of torsional and bending resistance. The larger the composite shell structure and the greater the stresses to which it may be subjected in operation, the greater the need for such reinforcement. Reinforcing elements may be discrete and remote from each other, may be disposed in mutually parallel relationship, or may be disposed in intersecting relationship to define a grid-type arrangement, wherein a large plurality of rib elements placed at intersecting orientations defines an array of triangular, square, otherwise polygonal or otherwise-shaped cavities. The composite shell structure may then be formed over the grid, or formed first on tooling, and then the grid formed onto the shell. One specifically favored grid pattern due to its non-preferential stress accommodation capabilities is a so-called "isogrid", wherein each cavity is triangular with three 60° apices. Reinforcing elements have conventionally been fabricated from metal elements (as in prior art all-metal assemblies) which, in the case of composite structures, is disadvantageous in terms of weight as well as accommodating differences in the coefficient of thermal expansion (CTE) of the metal reinforcing elements and that of the adjacent fiber composite shell in the final structure.

It is known in the art to hand-place resin (epoxy) impregnated fiber element "tows" onto tooling to create a grid-type arrangement of rib-like stiffeners. As noted above, the stiffeners may be formed directly on the tooling, or on a shell preform of composite fibers which has itself been applied to the tooling. A number of tows are typically laid up on a mandrel or other tooling in vertically superimposed, or stacked, relationship to define each stiffening rib of a desired height and cross-section. The tows are then cured simultaneously under applied heat and pressure with a contiguous composite shell (laid up either before or after the ribs on the tooling), as known in the art, to define the overall reinforced composite structure. However, hand-placement is slow, fails to provide an acceptable product in terms of quality due to the difficulty in applying the tows in exact superimposition and with precise, controlled pressure, and thus renders the fabrication process too labor-intensive and thus too expensive for relatively high production volumes such as are required for commercial applications. Moreover, hand layup techniques become ever-less satisfactory with both increasing complexity of a stiffening grid pattern and an increasing number of tow layers.

It is also known in the art to fabricate the stiffeners by automated application, or "winding", of fiber elements in the form of continuous filaments onto a cylindrical mandrel. However, filament winding has exhibited perceptible deficiencies in terms of inaccuracy of fiber placement, as well as insufficient compaction of the fiber. Further, filament winding generates an excess of fiber scrap since it requires a continuous, turnaround path when each end of a mandrel is reached; the filament turnarounds at the ends of the mandrel do not form part of the final structure, and so are cut off and discarded. In addition, known filament winding techniques provide no capability to "steer" the fiber filament to accommodate desired variations from a preprogrammed path, to place fiber on complex geometry mandrels, including those exhibiting concave exterior portions, or to terminate fiber element placement at a target point on tooling and then restart application of a new fiber element at a new target point. Filament winding demonstrates particularly severe limitations where stiffening members cross or intersect, due to any inability to eliminate or reduce fiber element buildup at the nodes where fiber elements oriented in two or more directions cross. Finally, known filament winding techniques lack the capability to place fiber at a zero degree angle, i.e., parallel, to the longitudinal axis of rotation of the mandrel.

Thus, there is a need in the art for an apparatus capable of placing discrete fiber elements in desired lengths and at desired angles along specified paths onto tooling so as to form stiffening structures onto which a blanket of composite fibers may be laid up to result in a reinforced, all-composite shell structure.

BRIEF SUMMARY OF THE INVENTION

The present invention accommodates the aforementioned need and provides other advantages relative to the current state of the art in the form of a compact, relatively simple, self-contained apparatus for controlled placement of discrete or discontinuous composite fiber elements onto tooling. As used herein, the term "composite fiber elements" or "fiber elements" contemplates carbon fibers impregnated with an epoxy resin as known in the art, as well as any other fiber elements impregnated or coated with a curable bonding agent. By way of example and not limitation, composite fibers may include elongated filaments of glass, graphite, boron, or polyaramid (Kevlar™), as specifications indicate. The invention is particularly suitable for placement of fiber elements comprising "tows" of multiple, parallel elongated fibers either mutually laterally adhered by the bonding agent, or maintained in place by transverse "warp" threads, both such structures being known in the art.

The apparatus of the present invention, which may also be termed a "delivery head" for the sake of convenience, includes a spool holder of a creel located at the rear thereof as the apparatus is oriented to place fiber elements onto tooling and a limited number of guide or redirect rollers (preferably only two) to constrain a continuous fiber element fed from a spool carried by the spool holder to a desired path as it travels from the spool to a guide tray, which maintains positional control of the fiber element as it passes from the guide rollers through a cut/add module and to a delivery chute. The creel is preferably temperature-controlled.

The cut/add module controls commencement and termination, or severance, of material (fiber element) feed for application to the mandrel or other tooling, and includes a cutting actuator for terminating a fiber element to a specified length as well as a feed actuator which activates a clamping mechanism for re-starting the fiber element feed as needed under a servo motor drive. The servo motor, preferably operated in a closed-loop position mode, is used to propel the fiber element through the guide tray and delivery chute during the add or restart operation to ensure that the fiber element reaches the tooling at the target location.

The delivery chute guides the fiber element from the cut/add section to the compaction roller, maintaining accurate positional control of the fiber element to ensure accurate placement onto the tooling.

The compaction roller applies the fiber element to the tooling using compaction force and heat, following the geometry of the tooling as controlled by a programmed machine controller. The compaction roller may operate in a "self-teach" mode during which the roller is enabled to "float" laterally and report its position to the controller so that the motion of the machine may be fine-tuned for optimum tracking of the tooling. In addition, the floating motion of the compaction roller assists in protecting the tooling from damage which might otherwise result if that roller were laterally constrained.

The apparatus of the invention provides a short, relatively non-convoluted fiber element delivery path from the creel to the compaction roller, promoting reliable operation and precise control of fiber element placement onto the tooling, as well as facilitating precise termination and re-start of fiber element placement.

Due to the precision with which fiber elements may be started, placed and terminated on a mandrel or other tooling, the present invention also includes methods of fiber element placement.

DETAILED DESCRIPTION OF THE INVENTION

Referring to drawing FIGS. 1 through 6, the structure and operation of a preferred embodiment 10 of the composite fiber element placement apparatus of the present invention will be described.

Fiber placement apparatus 10 is mounted to offset mounting adapter 12, which is affixed to a mounting frame 202 (shown in broken lines in FIG. 1) of a carriage 200 or other mounting structure proximate a mandrel or other tooling to which fiber element tows are to be applied by apparatus 10. An upright base mount 14 secures apparatus 10 to mounting adapter 12 via a plurality of cap screws 16, which extend through washers 18, and the heads of which are contained within counterbores 20 in the forward surface of base mount 14. Of course, other means might be employed to secure apparatus 10 to mounting adapter 12 or directly to a mounting frame 202 or other mounting structure.

A frame subassembly 26 is horizontally slidably mounted to base mount 14 so as to be capable of controlled travel toward and away from the mandrel or other tooling 160 to which fiber tows are to be applied. Such controlled travel is effected in part by supporting the weight of apparatus 10, but for base mount 14 and mounting adapter 12, on parallel linear slides 28 (see FIG. 3) which extend transversely to base mount 14. In addition, an actuator, preferably in the form of a double-acting pneumatic cylinder 30, is secured at the rear end of apparatus 10 to base mount 14, and the shaft 32 of pneumatic cylinder 30 is secured to frame subassembly 26 at 34. Cylinder 30 thus effects fore and aft movement of the apparatus components mounted to frame subassembly 26 responsive to pneumatic pressure opposingly applied through air lines 36 and under control of a programmed machine controller 150. By way of example only, a preferred fore and aft travel distance for frame subassembly 26 is approximately 2.5 inches. A measuring gage encoder 38, such as the Model P40 Measuring Gauge, available from Gurley Precision Instruments of Troy, N.Y., is secured to frame subassembly 26 and located to detect the precise position of frame subassembly 26 responsive to travel of spring-loaded encoder probe 40, which remains in contact with base mount 14.

A spool 42 having composite fiber element 44 wound therearound is carried by frame subassembly 26, preferably mounted in a cantilevered fashion on a spindle extending horizontally from upstanding strut 46 secured to base 48 of creel 50. Creel 50 also includes removable hood 52, which extends over spool 42 and which is releasably secured to each side of creel base 48 by clamp assemblies 54. The spool holder zone 56 within the creel 50 is temperature controlled by a flow of conditioned air thereinto through cold air inlet port 58 (see FIG. 2) fed by a vortex cooler 59 in order to preclude the impregnated fiber from becoming too tacky or too inflexible on the spool. The air flow exits the spool holder zone 56 through gaps between the hood 52 and portions of frame subassembly 26.

Fiber element 44, which may comprise a single tow of (for example) one-eighth (0.125) inch or one-quarter (0.25) inch width comprised of a plurality of mutually parallel, epoxy resin-impregnated carbon fibers, is fed downwardly from the rear of spool 42 onto and about rear guide, or redirect, roller 60 mounted to frame subassembly 26 to change the direction of fiber element 44 approximately 90° and toward the tooling. Tray redirect roller 62, also mounted to frame subassembly 26, in turn directs fiber element 44 to guide tray 70. Rear redirect roller 60 is laterally sized to accommodate any tow width usable with apparatus 10, but tray redirect roller 62 is preferably sized to accommodate a specific tow, or multiple-tow band, width, extending flanges 64 of roller 62 laterally constraining fiber element 44. Rollers 60 and 62 are preferably provided with a suitable covering of, for example, polytetrafluoroethylene (sold as Teflon® polymer), to substantially preclude adhesion of the resin-impregnated fiber element 44 thereto.

Guide tray 70, also mounted to frame subassembly 26, maintains precise positional control of fiber element 44 as it progresses through the cut/add module 72 and to the guide or delivery chute 100. Servo motor 80 powers drive roller 82 through timing pulley 84 and timing belt 86, and clamp roller 88 is pivotally mounted at 90 and selectively powered pneumatically by actuator 92 to press fiber element 44 against drive roller 82. Drive roller 82 and clamp roller 88 are provided with a suitable covering such as urethane to provide traction and surface compliance to advance fiber element 44 as clamp roller 88 is actuated against drive roller 82. Servo motor 80 is operated in a closed loop position mode to ensure that fiber element 44 reaches the tooling at the target location. Guide or delivery chute 100, which receives fiber element 44 from guide tray 70 and is secured thereto, is laterally sized to precisely laterally constrain fiber element 44 as it travels to guide scoop 102 adjacent compaction or delivery roller 104, which is also precisely laterally sized to the specific tow or band width of the fiber element 44. Double-acting pneumatic knife actuator 106 is positioned transversely to the path of fiber element 44 through guide chute 100 so that knife blade 108 may be positively advanced through severance gap 110 in guide chute 100 to contact fiber element 44 and sever it into a tow or band of discrete length adjacent anvil 112. Knife actuator 106 is selectively powered through compressed air lines 114. It should be understood that clamp roller actuator 92 and knife actuator 106, or either of them, may be driven electrically rather than pneumatically, and that a single-acting knife actuator using a spring return may also be suitably employed in lieu of a double-acting actuator.

Optionally, a second vortex cooler 59 may be employed to generate cooling air delivered by tubing or other conduit 61 to the cut/add module 72 in the vicinity of the path of fiber element 44 therethrough to keep rollers 82 and 88, knife blade 108 and anvil 112 and guide tray 70 cool to reduce resin buildup from the passage of fiber element 44.

Compaction roller 104 is an unpowered, or free-wheeling, roller which rotates responsive to fiber element 44 being paid out onto the tooling at a target location. Guide scoop 102, extending from the end of guide chute 100 follows the curvature of the outer periphery of compaction roller 104 and is spaced therefrom a substantially continuous radial distance slightly larger than a thickness of fiber element 44. The outer periphery of compaction roller 104 is preferably covered with an elastomeric material, such as rubber, conformable to the surface contour of the mandrel or other tooling 160 or to previously-applied tows to ensure consistent and uniform application, compaction and adherence of the tows. As may be seen in FIGS. 1 and 3, roller 104 is preferably biased toward a central position on its shaft 120, which is mounted at each end to nose piece 121, by coil springs 122 acting on both sides of the hub of roller 104. The precise lateral position of roller 104 during operation is detected by encoder 124, probe 126 of which lies adjacent one side of roller 104. Encoder 124 may also comprise the previously-mentioned Model P40 Measuring Gauge from Gurley Precision Instruments. As a result of this positional monitoring in combination with the spring-biased, free-floating lateral action of the compaction roller 104, the lateral position of roller 104 on shaft 120 is reported back to the machine controller 150 so that the motion of the apparatus 10 may be fine-tuned for optimum tracking of the mandrel for fiber delivery and compaction in a "self-teach" mode. In addition, the floating action of the compaction roller 104 serves to protect the tooling from damage which might occur if the lateral motion of the roller 104 were constrained.

Figure 5:
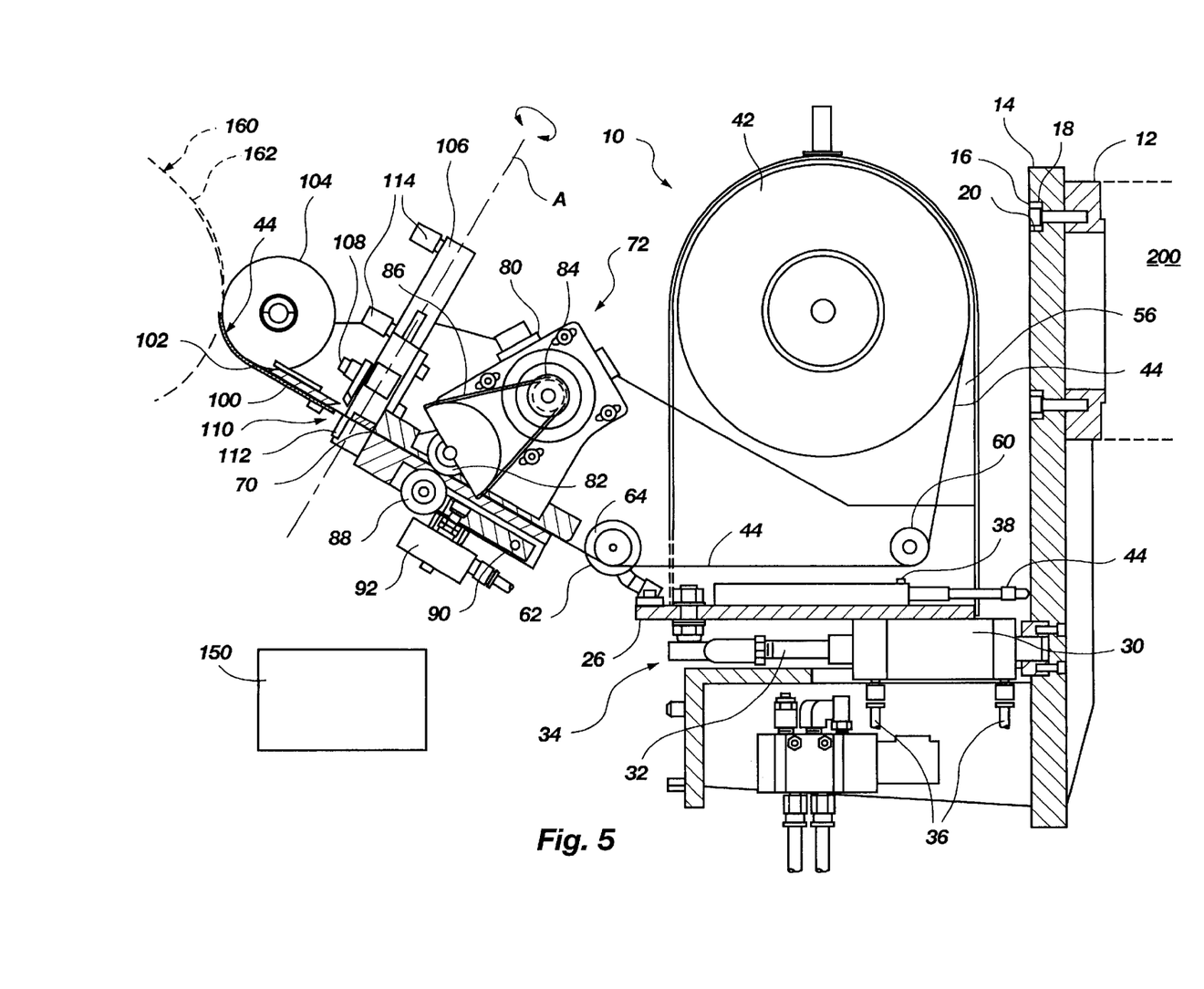
FIG. 5 is a side sectional elevation of the apparatus shown in FIG. 1.

It should be noted again at this juncture, and specifically with reference to FIG. 5 of the drawings, that the path of fiber element 44 from spool 42 to compaction roller 104 is relatively simple and unconvoluted in comparison to conventional apparatus for fiber element application. For example, the path of fiber element 44 is redirected far less than 180°, and actually only in the range of about 110° to about 130° (depending on how full spool 42 is), from its initial downward path from spool 42 until it reaches the periphery of compaction roller 104, so that undue bending and twisting of fiber element 44 is eliminated, preserving the integrity of the fiber element. In addition, it should also be noted that the path of fiber element 44 between tray redirect roller 62 and the periphery of compaction roller 104 is substantially linear to better ensure that the maximum surface area of fiber element 44 is presented to tooling 160 (or to a previously-applied tow) and pressed firmly thereagainst with the individual fibers of the element aligned in parallel and with an even distribution of resin.

Compaction roller 104 applies fiber element 44 to the tooling using compaction force against tooling 160, preferably under elevated temperature conditions. Compaction force is provided by double-acting pneumatic cylinder 30, previously described. Heat is provided to the compaction zone on the tooling 160 to render the epoxy resin of fiber element 44 tacky to enhance adherence thereto or to previously-laid tows by a hot air torch 130, the fan-shaped nozzle 132 of which lies immediately below compaction roller 104 and guide scoop 102.

In operation of apparatus 10 of the invention, fiber element 44 is fed to compaction roller 104 under control of programmed machine controller 150. The target start point on the tooling 160 for commencement of application of a discrete segment, or tow, of fiber element 44 has been selected, and fiber element 44 has been advanced to compaction roller 104 by the cooperation of drive roller 82 and clamp roller 88. Apparatus 10 may either be mounted to a carriage 200 traversable in a direction parallel to the longitudinal axis or direction of elongation of the mandrel or other tooling 160 through mounting adapter 12 to effect lateral movement parallel thereto to facilitate application of fiber element tows 162 at positions along the entire length thereof, or the mandrel or other tooling 160 may be mounted for such lateral movement past apparatus 10. Preferably, carriage 200 comprises part of a six-axis fiber placement machine of the type disclosed in U.S. Pat. No. 4,867,834, so that tows may be placed at any position and angle on the mandrel or other tooling. The referenced axes include the aforementioned longitudinal carriage movement, as well as radial carriage movement transverse to the longitudinal axis of the mandrel, roll, pitch and yaw movement of the apparatus 10 with respect to carriage 200, and rotation of the mandrel or other tooling 160 about its longitudinal axis. As used herein with respect to movement of apparatus 10, "roll" identifies rotational motion about a horizontal axis perpendicular to the mandrel axis, "pitch" identifies rotational motion about a horizontal axis parallel to the mandrel axis, and "yaw" identifies rotational motion about a vertical axis. Most preferably, carriage 200 comprises part of a multi-axis fiber placement machine affording seven axes of motion for tow placement, including the aforementioned six as well as an ability to alter the elevation of apparatus 10. It should again be noted that the self-contained nature of the apparatus of the present invention, including its own supply of fiber element 44, facilitates rotation of apparatus 10 about an axis perpendicular to the tooling 160 and thus permits running of tows parallel to the tooling axis.

Figure 6:
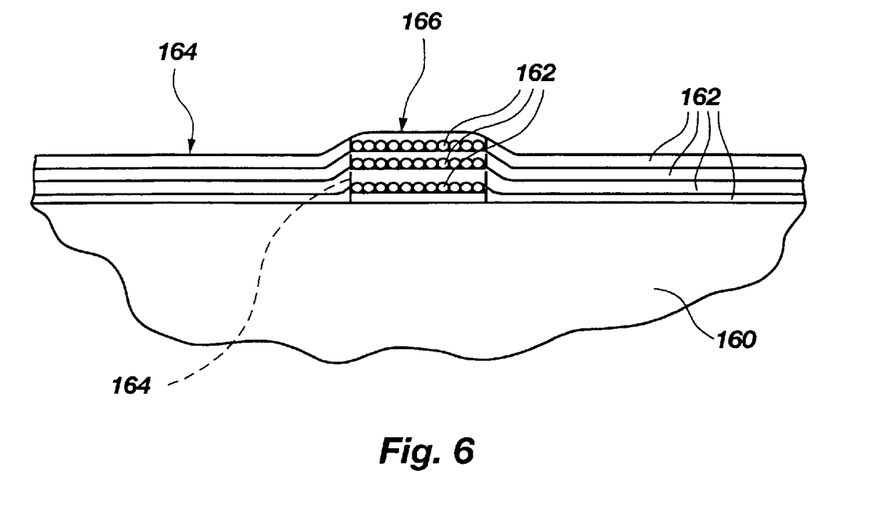
FIG. 6 is a partial cross-sectional view of intersecting groups of stacked tows at a grid node where two stiffening ribs of the grid cross.
Figure 7:
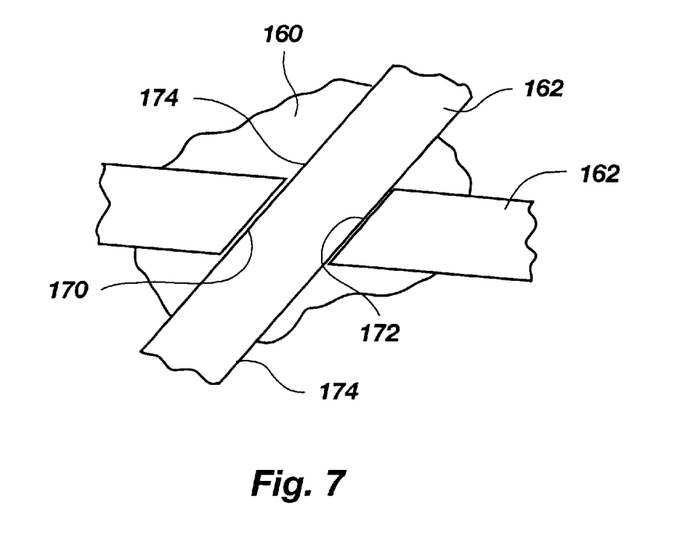
FIG. 7 is a top elevation of abutting tows applied at intersecting angles according to the present invention.

In either case, when the compaction roller 104 is adjacent the target fiber application start point, the apparatus 10 is driven forward by pneumatic cylinder 30 against the tooling 160, which rotates about its axis while fiber element 44 is applied thereto and compacted thereagainst by roller 104 while heat is applied by torch nozzle 132. FIG. 5 schematically depicts application of fiber element 44 in the form of a tow 162 (shown in broken lines) to tooling 160. Of course, relative movement of either tooling 160 or apparatus 10 along the longitudinal axis of the tooling 160 may be simultaneously effected so that a tow 162 comprising a portion of fiber element 44 may be applied in any desired angular direction. When the controller 150 detects that an appropriate length of fiber element 44 has been paid out from spool 42, it actuates knife actuator 106 at a time that ensures that the "tail" of the tow downstream of knife actuator 106 is the correct length to complete application of the tow 162 to the tooling 160 at a target endpoint. The apparatus 10 and tooling are then moved, and/or rotated in the case of the tooling 160, to a new tow target start point, fiber element feed is restarted, and the new tow applied and compacted under heat and pressure. By multiple applications of superimposed or stacked tows 162, reinforcing ribs or "stiffeners" 164 may be built up on the tooling or mandrel 160 as shown in FIG. 6. Further, and also as shown in FIG. 6, tows 162 may be easily laid in different directions so as to overlap or intersect at nodes 166 to define a grid pattern of stiffeners 164 as previously mentioned. The cut and add capability of apparatus 10 also facilitates fabrication of nodes with abutting, rather than overlapping, tows 162 running in different directions, or a combination of abutting and overlapping tows 162, as dictated by the programming of controller 150. It is further contemplated that the knife actuator 106, which also carries anvil 112, may be mounted so as to rotate about an axis A (see FIG. 5) intersecting and perpendicular to the path of fiber element 44 through guide chute 100 responsive to rotational drive unit R shown schematically in broken lines under control of controller 150. In such a manner, when using a knife blade 108 and anvil 112 of greater width than fiber element 44 to be severed, the cut angle of the fiber element 44 may be changed as required to match the cut angle of the knife blade 108 to the crossover angle between tows 162 being applied in different directions so that a leading end surface 170 of a first tow 162 and a trailing end surface 172 of a second tow 162 (see FIG. 7) will each lie substantially parallel to a side 174 of a previously-applied tow 162 against which that respective end surface abuts (leading and trailing ends 170 and 172 shown slightly spaced from sides 174 for clarity in FIG. 7).

While the present invention has been described in terms of an illustrated, preferred embodiment, those of ordinary skill in the art will understand and appreciate that the invention is not so limited. Rather, additions, deletions and modifications to the invention as disclosed herein may be effected without departing from the scope of the invention as hereinafter claimed.

What is claimed is:

1. An apparatus for applying a fiber element to a work surface, comprising:

a base mount configured for suspending the apparatus from a carriage structure in a manner permitting at least roll, pitch and yaw movement of the apparatus by the carriage structure and with respect thereto; and     a frame member supported on and selectively movable toward and away from the base mount by an actuator carried by the base mount, the frame member having mounted thereon:

a spool holder including support structure for rotatably carrying a spool bearing an elongated fiber element wound thereon;

a first roller located for receiving the fiber element directly from a spool carried on the support structure and a second roller for guiding a fiber element received from a spool carried by the spool holder, the first and second rollers each being oriented for rotation about an axis substantially parallel to an axis of rotation defined the support structure for a spool carried thereon;

a guide assembly for receiving the fiber element from the second roller and having associated therewith a drive assembly for selectively moving the fiber element and a knife assembly for selectively cutting the fiber element after movement thereof through the drive assembly; and         a compaction element for receiving the fiber element from the guide assembly thereon and pressing the fiber element against the work surface.

2. The apparatus of claim 1, wherein the frame member is supported by the base mount through a linear slide, and further including an encoder for determining a position of the frame member relative to the base mount.

3. The apparatus of claim 2, wherein the actuator comprises a double-acting pneumatic cylinder.

4. The apparatus of claim 1, wherein the first roller is disposed and oriented to receive a fiber element moving in a downward direction from the spool and redirect the fiber element toward the second roller.

5. The apparatus of claim 4, wherein the second roller is disposed and oriented to receive a fiber element moving from the first roller and redirect the fiber element into the guide assembly.

6. The apparatus of claim 1, wherein the drive assembly includes a servo motor controllable by a machine controller in a closed loop position mode for measuring a length of a fiber element driven thereby.

7. The apparatus of claim 6, wherein the drive assembly further includes a drive roller driven by the servo motor through a timing pulley and timing belt, and a clamp roller selectively movable toward the drive roller with a fiber element therebetween to cause the fiber element to be engaged by the drive roller.

8. The apparatus of claim 7, further including an actuator for moving the clamp roller toward the drive roller.

9. The apparatus of claim 8, wherein the actuator comprises a pneumatic actuator.

10. The apparatus of claim 1, wherein the knife assembly includes a blade selectively movable transversely to and across a path of the fiber element passing through the guide assembly, and an actuator for moving the blade across the fiber element path and retracting the blade.

11. The apparatus of claim 10, wherein the actuator comprises a double-acting pneumatic actuator.

12. The apparatus of claim 10, wherein the guide assembly further includes a guide chute defining a severance gap into which the blade may be received when moved across the fiber element path.

13. The apparatus of claim 10, wherein the knife assembly is rotatably mounted about an axis perpendicular to the fiber element path.

14. The apparatus of claim 1, wherein the compaction element comprises a compaction roller rotatable about a shaft mounted transversely to a path of a fiber element received from the guide assembly.

15. The apparatus of claim 14, wherein the compaction roller is free-wheeling on the shaft.

16. The apparatus of claim 15, wherein the compaction roller is laterally resiliently biased toward a position along the shaft.

17. The apparatus of claim 16, wherein the compaction roller is resiliently biased from both sides parallel to the shaft.

18. The apparatus of claim 17, wherein the resilient biasing is effected by coil springs carried on the shaft, one on each side of the compaction roller.

19. The apparatus of claim 16, further including an encoder for detecting a position of the compaction roller along the shaft.

20. The apparatus of claim 1, further including a controllable heat source having an outlet adjacent the compaction element.

21. The apparatus of claim 20, wherein the heat source comprises a hot air torch and the outlet comprises a nozzle.

22. The apparatus of claim 1, further including a substantially enclosed spool holder zone and a conditioned air source carried by the frame member for providing conditioned air to the spool holder zone.

23. The apparatus of claim 1, further including a duct for conveying conditioned air from a conditioned air source to a substantially enclosed spool holder zone.

24. The apparatus of claim 23, further including a conditioned air source for providing the conditioned air to the duct.

25. The apparatus of claim 1, wherein the spool holder support structure includes a spindle oriented substantially transversely to a direction of movement of the frame member toward and away from the base mount.

26. The apparatus of claim 1, wherein the first and second rollers and guide assembly are positioned and oriented to effect reorientation of the fiber element as received from a spool carried by the support structure no more than twice before reaching the compaction element.

27. The apparatus of claim 26, wherein the second roller, guide assembly and compaction element are arranged to define a substantially linear fiber element path between a periphery of the second roller and a periphery of the compaction element.

28. The apparatus of claim 1, wherein the second roller, at least part of the guide assembly, and the compaction element are sized to accommodate a fiber element of a specific width.

29. The apparatus of claim 1, further including a duct for providing conditioned air proximate the guide assembly.

30. The apparatus of claim 1, further including a conditioned air source carried by the frame member for providing conditioned air proximate the guide assembly.

* * * * *

UNITED STATES PATENT AND TRADEMARK OFFICE
CERTIFICATE OF CORRECTION

PATENT NO. : 6,026,883
DATED : February 22, 2000
INVENTOR(S) : Hegerhorst et al.

It is certified that error appears in the above-identified patent and that said Letters Patent is hereby corrected as shown below:

Title page,
Item [56], References Cited, OTHER PUBLICATIONS, change "composite" to
-- Composite --.

Figure 1:
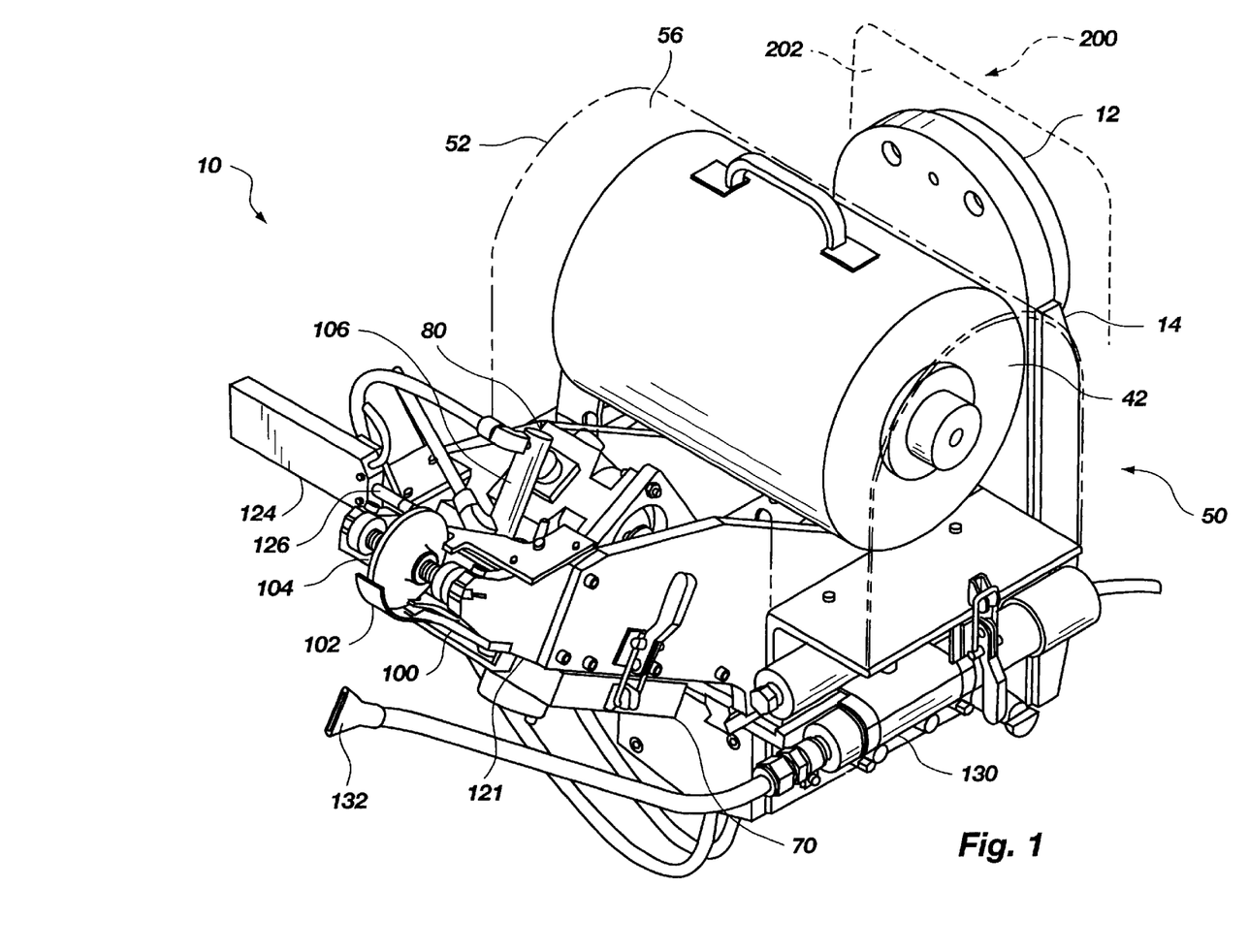
FIG. 1 of the drawings is an enlarged, right-hand isometric view of a preferred embodiment of the apparatus of the present invention.
Figure 2:
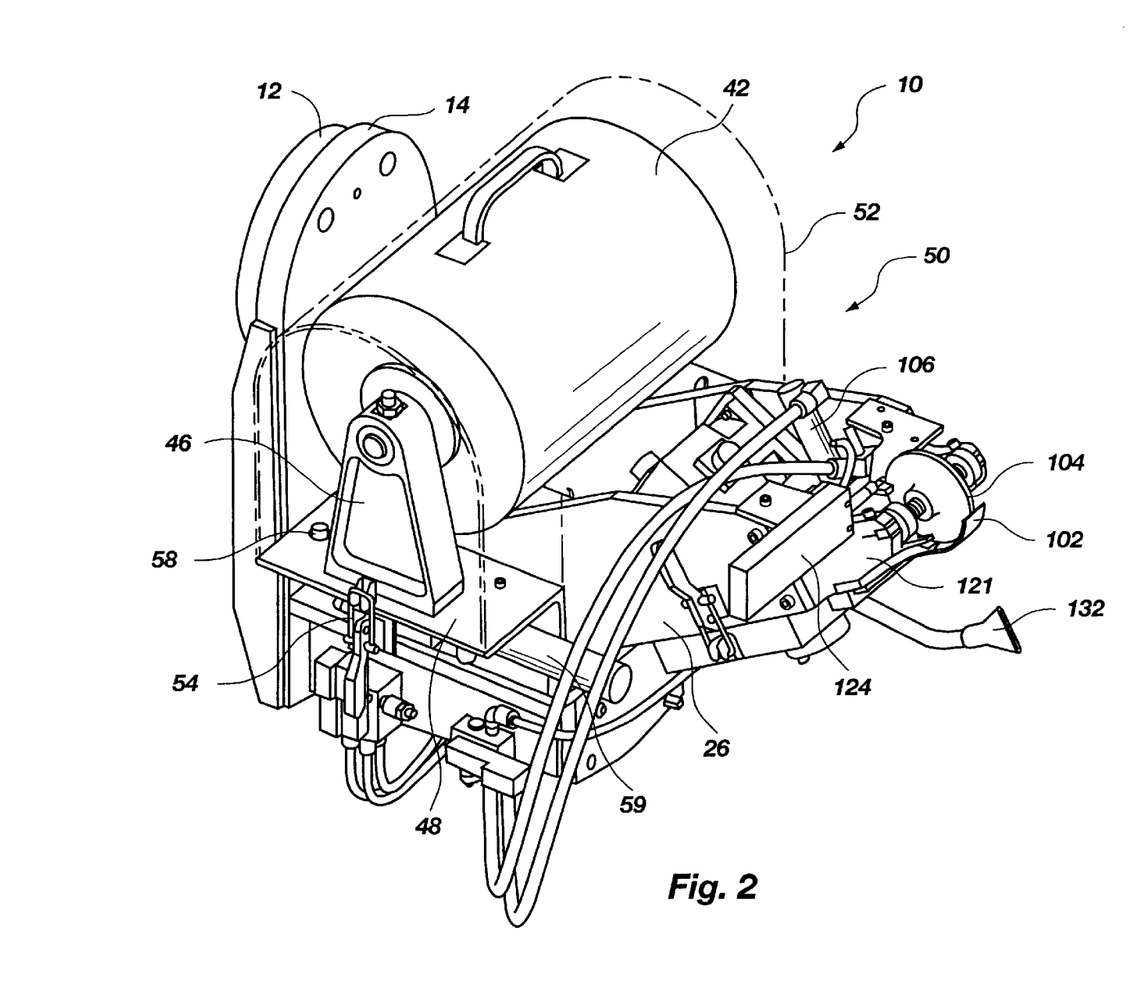
FIG. 2 is a left-hand isometric view of the apparatus shown in FIG. 1.
Figure 3:
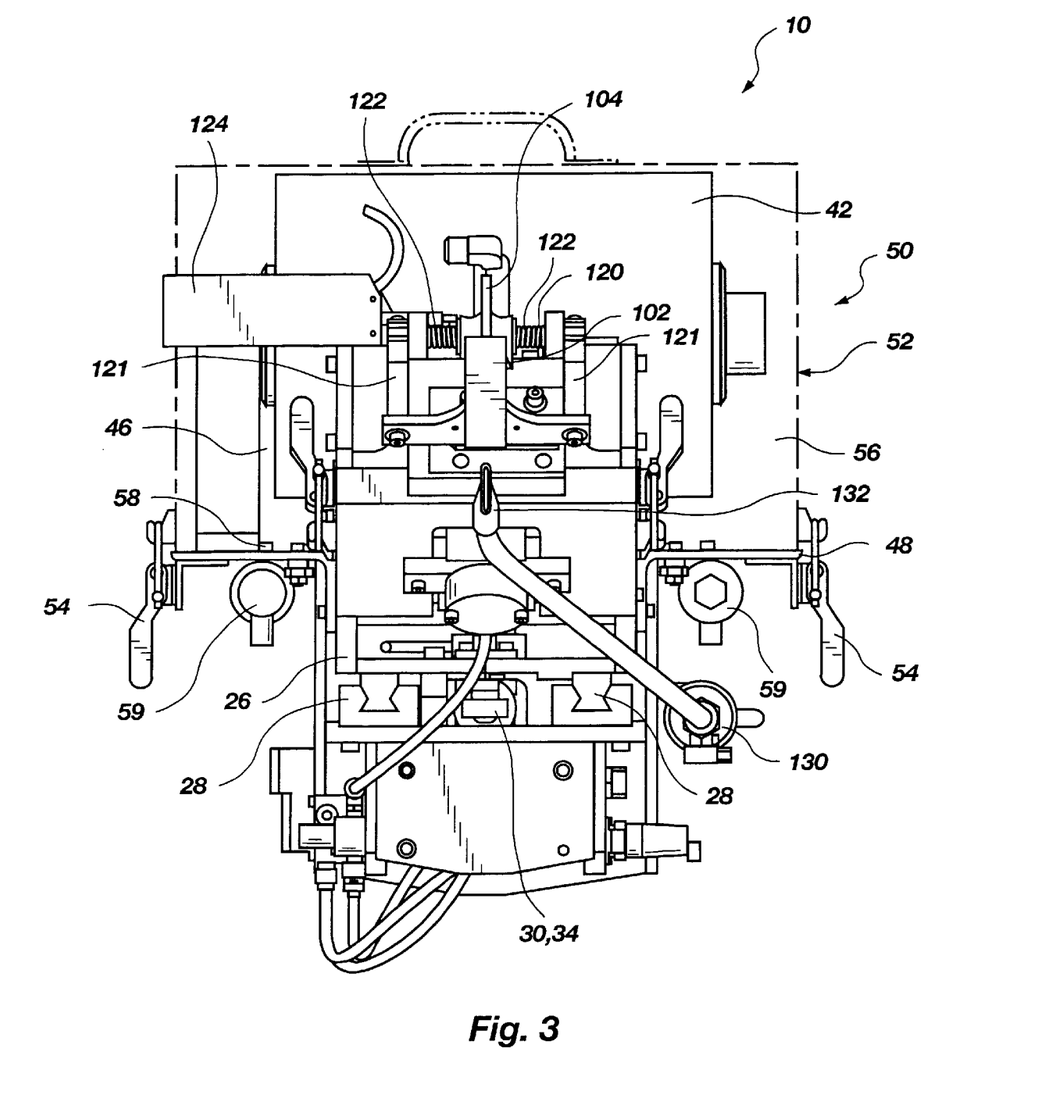
FIG. 3 is a frontal elevation of the apparatus shown in FIG. 1.
Figure 4:
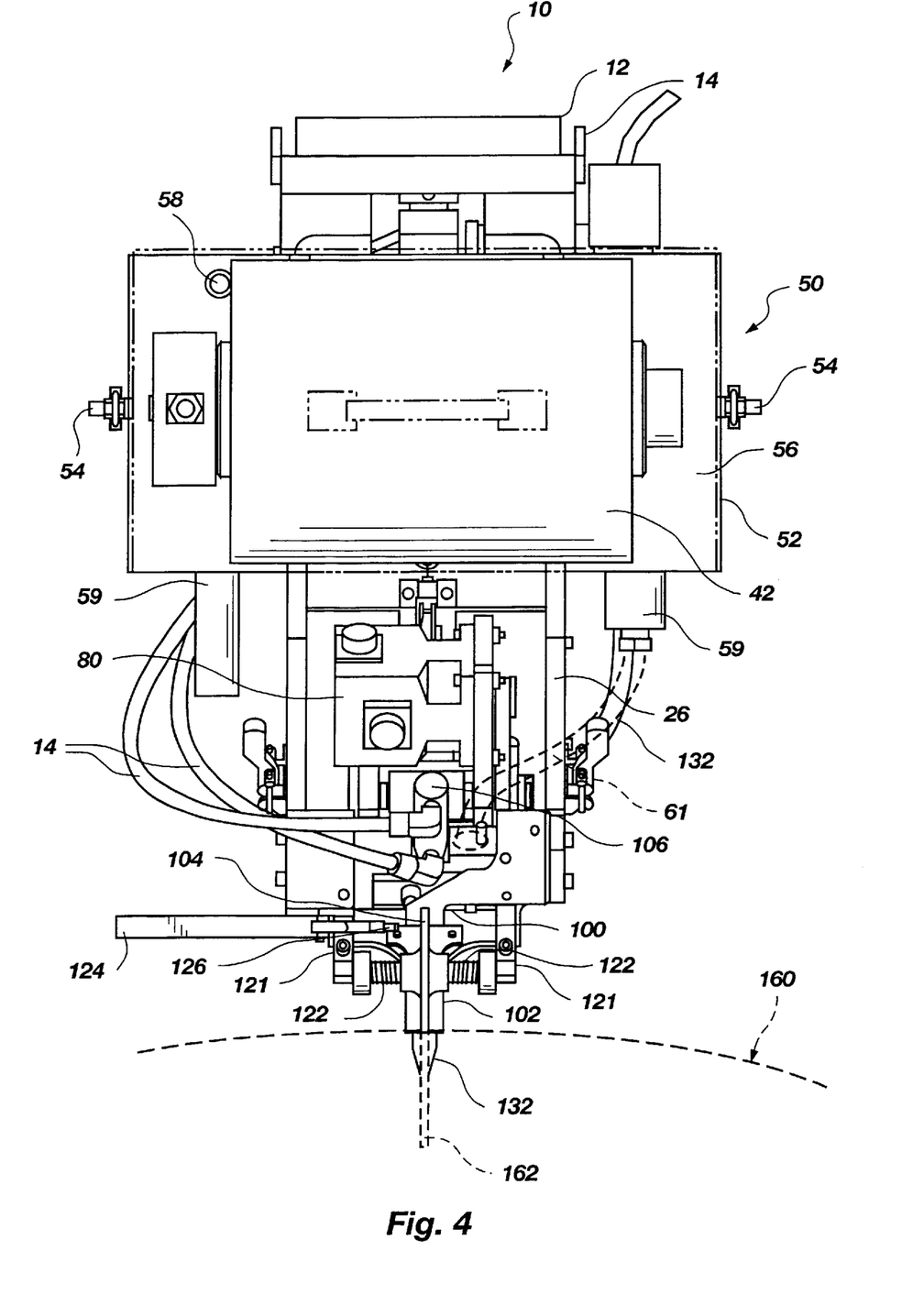
FIG. 4 is a top elevation of the apparatus shown in FIG. 1.

Drawings,
Fig. 4, change reference numeral "14" at left -hand side of drawing to -- 114 --; and
Fig. 5, change reference numeral "44" on right side, second number from bottom, to --
40 --.

Column 2,
Line 23, after "path" delete ",";
Line 58, after "parallel" insert --, --; and
Line 60, after "agent" delete ",".

Column 8,
Line 10, after "guiding" change "a" to -- the --;
Line 14, after "defined" insert -- by --;

Column 9,
Line 1, after "of" change "a" to -- the --; and

Column 10,
Line 1, change "a" to -- the --.

Signed and Sealed this

Twenty-third Day of July, 2002

*Attest:*

JAMES E. ROGAN
*Attesting Officer*   *Director of the United States Patent and Trademark Office*